United States Patent
Dhoot et al.

(10) Patent No.: US 11,755,034 B1
(45) Date of Patent: Sep. 12, 2023

(54) COLLABORATIVE SOLAR POWER GENERATION

(71) Applicant: INTERNATIONAL BUSINESS MACHINES CORPORATION, Armonk, NY (US)

(72) Inventors: Akash U. Dhoot, Pune (IN); Shilpa Bhagwatprasad Mittal, Pune (IN); Sarbajit K. Rakshit, Kolkata (IN); Shailendra Moyal, Pune (IN)

(73) Assignee: International Business Machines Corporation, Armonk, NY (US)

(*) Notice: Subject to any disclaimer, the term of this patent is extended or adjusted under 35 U.S.C. 154(b) by 31 days.

(21) Appl. No.: 17/655,809

(22) Filed: Mar. 22, 2022

(51) Int. Cl.
*G05D 1/02* (2020.01)
*H02S 20/32* (2014.01)
(Continued)

(52) U.S. Cl.
CPC ............ *G05D 1/0293* (2013.01); *B60L 8/003* (2013.01); *B60L 58/13* (2019.02); *G05D 1/0278* (2013.01);
(Continued)

(58) Field of Classification Search
CPC .............. G05D 1/0293; G05D 1/0278; G05D 2201/0213; B60L 8/003; B60L 58/13; H02S 10/40; H02S 20/32
See application file for complete search history.

(56) References Cited

U.S. PATENT DOCUMENTS

| 10,913,360 B2 | 2/2021 | Gaither |
| 11,029,168 B2 | 6/2021 | Stroman |

(Continued)

FOREIGN PATENT DOCUMENTS

| CN | 102267392 A | 12/2011 |
| CN | 107703380 A | 2/2018 |

(Continued)

OTHER PUBLICATIONS

Disclosed Anonymously, "Solar Energy Capture Optimization," IP.com, IP.com No. IPCOM000261034D, IP.com Publication Date: Jan. 20, 2020, 4 pages.

(Continued)

*Primary Examiner* — Donald J Wallace
(74) *Attorney, Agent, or Firm* — Anthony M. Pallone (57) ABSTRACT

According to one embodiment, a method, computer system, and computer program product for solar power generation is provided. The embodiment may include identifying relative positions of co-located electric autonomous vehicles (EAVs) within a group. The embodiment may include identifying solar power generation metrics for each EAV. The embodiment may include determining whether at least two EAVs have a same side unexposed to direct sunlight. In response to determining at least two EAVs have a same side unexposed to direct sunlight, the embodiment may include identifying a direction and an angle of solar light impacting the group. Based on the relative positions and the direction and angle of solar light, the embodiment may include instructing a collaborative movement among the group such that solar light is reflected from an exterior surface of at least one EAV to an exterior surface of at least one other EAV which was unexposed to sunlight.

20 Claims, 5 Drawing Sheets

(51) Int. Cl.
*B60L 8/00* (2006.01)
*B60L 58/13* (2019.01)
*H02S 10/40* (2014.01)

(52) U.S. Cl.
CPC .............. *H02S 10/40* (2014.12); *H02S 20/32* (2014.12); *G05D 2201/0213* (2013.01)

(56) References Cited

U.S. PATENT DOCUMENTS

| | | | | |
|---|---|---|---|---|
| 11,560,194 | B2* | 1/2023 | Griffith | .................... B62M 6/85 |
| 2013/0314699 | A1* | 11/2013 | Jungerman | ........... G01J 1/0242 |
| | | | | 356/139.01 |
| 2019/0084427 | A1* | 3/2019 | Dudar | ................. H01M 10/465 |
| 2019/0248243 | A1 | 8/2019 | Gaither | |

FOREIGN PATENT DOCUMENTS

| | | |
|---|---|---|
| CN | 111016594 A | 4/2020 |
| KR | 20200097853 A | 8/2020 |
| WO | 2017015353 A1 | 1/2017 |
| WO | 2018051076 A1 | 3/2018 |

OTHER PUBLICATIONS

Lee et al., "The Development of Transparent Photovoltaics," CellPress Open Access, Cell Reports Physical Science 1, 100143, Aug. 26, 2020, https://www.cell.com/cell-reports-physical-science/pdf/S2666-3864(20)30147-8.pdf, 24 pages.

Mell et al., "The NIST Definition of Cloud Computing", National Institute of Standards and Technology, Special Publication 800-145, Sep. 2011, 7 pages.

Pearce, "Can Mirrors Boost Solar Panel Output—and Help Overcome Trump's Tariffs?," Renewable Energy World, Jan. 29, 2018, https://www.renewableenergyworld.com/solar/can-mirrors-boost-solar-panel-output-and-help-overcome-trump-s-tariffs/#gref, 5 pages.

"Patent Cooperation Treaty PCT International Search Report", Applicant's File Reference: PF221149PCT, International Application No. PCT/CN2023/082461, International Filing Date: Mar. 20, 2023, dated Jun. 14, 2023, 7 pages.

* cited by examiner

COLLABORATIVE SOLAR POWER GENERATION

BACKGROUND

The present invention relates generally to the field of computing, and more particularly to solar power generation.

Solar power is the conversion of renewable energy from sunlight into thermal or electrical energy. Electricity from sunlight may be produced using photovoltaics (PV) (i.e., photovoltaic cells) which convert light into an electric current using semiconducting materials that exhibit the photovoltaic effect. The photovoltaic effect is the generation of voltage and electric current in a material upon exposure to light and is commercially utilized for electricity generation and as photosensors (i.e., sensors of light or other electromagnetic radiation). For instance, photovoltaic cells may be used in infrared detectors, light intensity calculators, solar fans, and solar panels for producing electricity for homes or offices. PV is one of the fastest-growing renewable energy technologies, as such, solar power is used worldwide and is becoming increasingly popular for generating electricity.

SUMMARY

According to one embodiment, a method, computer system, and computer program product for solar power generation is provided. The embodiment may include identifying relative positions of co-located electric autonomous vehicles (EAVs) within a group. The embodiment may include identifying solar power generation metrics for each EAV of the group. The embodiment may include determining whether at least two EAVs of the group have a same side unexposed to direct sunlight based the solar power generation metrics for each EAV. In response to determining at least two EAVs of the group have a same side unexposed to direct sunlight, the embodiment may include identifying a direction and an angle of solar light impacting the group. Based on the relative positions and the direction and angle of solar light, the embodiment may include instructing a collaborative movement among the group such that solar light is reflected from an exterior surface of at least one EAV to an exterior surface of at least one other EAV which was unexposed to direct sunlight.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to solar power generation. The following described exemplary embodiments provide a system, method, and program product to, among other things, identify multiple traveling electric autonomous vehicles which are capable of generating electricity via respective photovoltaic cells and, accordingly, position at least a first electric autonomous vehicle relative to a second electric autonomous vehicle such that the first electric autonomous vehicle reflects sunlight onto a side of the second electric autonomous vehicle which was unexposed to sunlight. Therefore, the present embodiment has the capacity to improve the technical field of solar power generation by dynamically positioning one or more electric autonomous vehicles of a traveling group to minimize a number of vehicle sides unexposed to sunlight, thus enabling collaborative movement and generation of additional solar power by portions of the autonomous electric vehicles which were previously unexposed to sunlight.

As previously described, solar power is the conversion of renewable energy from sunlight into thermal or electrical energy. Electricity from sunlight may be produced using PV (i.e., photovoltaic cells) which convert light into an electric current using semiconducting materials that exhibit the photovoltaic effect. The photovoltaic effect is the generation of voltage and electric current in a material upon exposure to light and is commercially utilized for electricity generation and as photosensors (i.e., sensors of light or other electromagnetic radiation). For instance, photovoltaic cells may be used in infrared detectors, light intensity calculators, solar fans, and solar panels for producing electricity for homes or offices. PV is one of the fastest-growing renewable energy technologies, as such, solar power is used worldwide and is becoming increasingly popular for generating electricity.

Another area of increasing popularity is the development and use of electric autonomous vehicles (EAVs), such as a self-driving electric car, powered by one or more onboard rechargeable batteries (e.g., lithium-ion batteries). Still, such electric vehicles are limited in their geographic range of operation as their batteries require recharging. Although electric vehicle charging stations are also increasing in popularity, they may still remain fewer and further between than required by an electric vehicle. However, advances in PV, particularly in the area of transparent photovoltaics (TPV), may enable an electric vehicle equipped with transparent photovoltaic cells on multiple vehicle surfaces and sides to generate electricity which may be used to recharge one or more onboard batteries while the vehicle is on the move. Nevertheless, as the electric vehicle is in transit on a roadway, there may be at least one side of the vehicle which may not be exposed to sunlight and consequently may not generate electricity via the transparent photovoltaic cells on that side. Thus, there may be an opportunity to utilize an unexposed vehicle side to generate electricity while in transit. It may therefore be imperative to have a system in place to implement collaborative movement among two or more EAVs so that one EAV may reflect sunlight onto a portion (e.g., a side) of another EAV which was previously unexposed to sunlight and thereby enable solar power generation from the reflected sunlight. Thus, embodiments of the present invention may be advantageous to, among other things, identifying relative positions of multiple EAVs co-located and traveling on a roadway, identifying electrical power requirements of the multiple EAVs, identifying solar light direction, and instructing collaborative movement among the multiple EAVs so that additional solar power may be generated, via reflected light, to supplement electrical power requirements. The present invention does not require that all advantages need to be incorporated into every embodiment of the invention.

According to at least one embodiment, while traveling on a roadway, relative geographical positions and velocities of co-located EAVs capable of solar power generation may be identified. The direction of solar light relative to the EAVs may be identified, as well as other weather conditions and roadway conditions. Based on the direction of solar light and other factors, the EAVs may be dynamically repositioned on the roadway, and their velocities synchronized, so that sunlight is reflected from the surface of at least one of the EAVs to a surface portion of at least one other EAV which was previously unexposed to direct sunlight and solar power generation among the co-located EAVs may be maximized. According to at least one embodiment, other factors may include analysis of shadows caused by the co-located EAVs and other objects. According to at least one other embodiment, power requirements/levels of each of the co-located EAVs may be identified, and the EAVs may be dynamically repositioned on the roadway, and their velocities synchronized, so that sunlight is reflected from the surface of at least one of the EAVs to a surface portion, which was previously unexposed to direct sunlight, of at least one other EAV requiring additional solar power generation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to implement, while EAVs are traveling on a roadway, collaborative movement among the EAVs such that a first EAV may reflect sunlight onto a side of a second EAV thereby enabling the second EAV to generate solar power via transparent photovoltaic cells located thereon.

Figure 1:
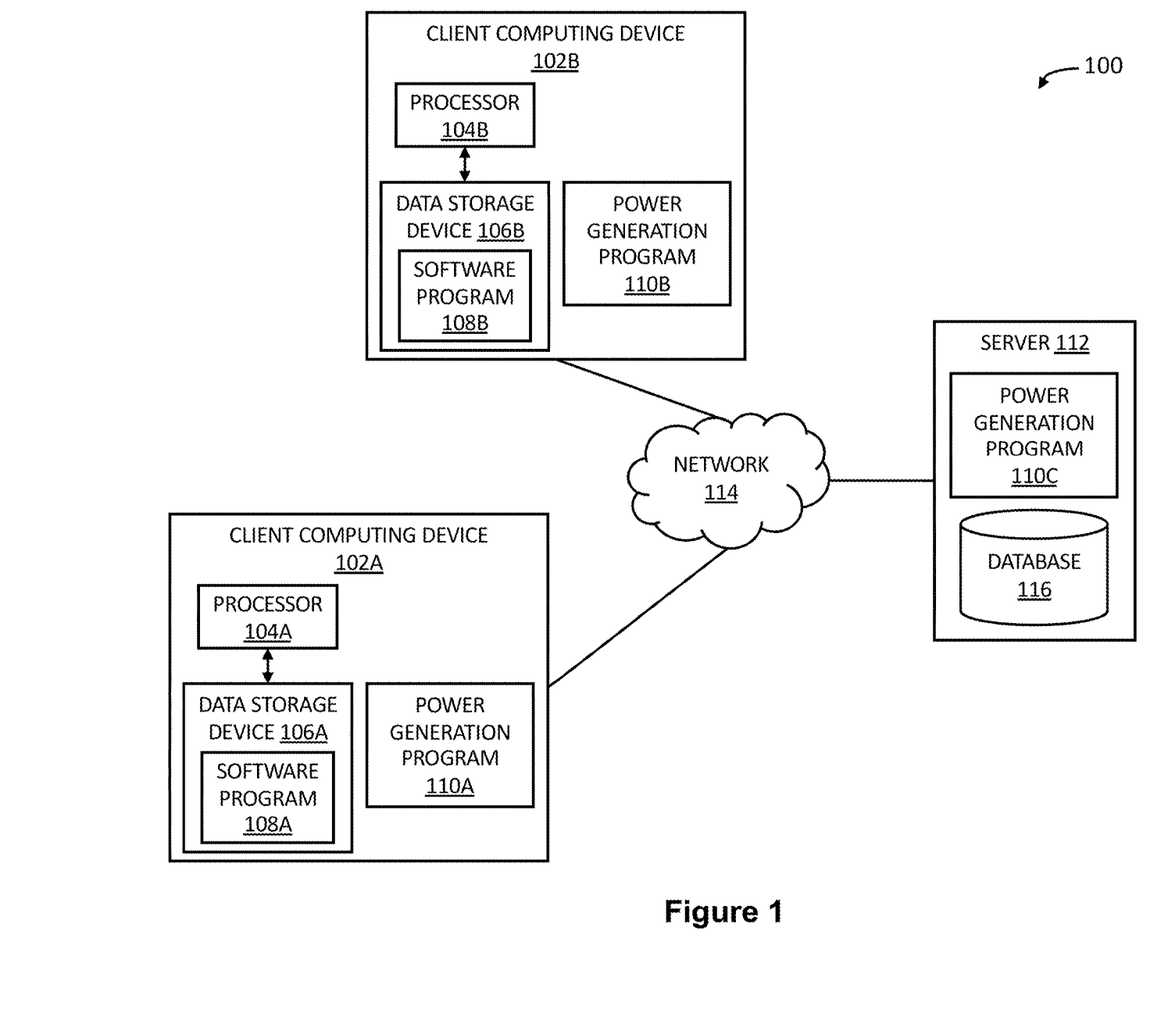
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102A, a client computing device 102B, and a server 112 interconnected via a communication network 114. According to at least one implementation, the networked computer environment 100 may include a plurality of client computing devices 102 and servers 112, the two client computing devices 102A, 102B and the single server 112 is shown for illustrative brevity. Additionally, in one or more embodiments, the client computing device 102A, the client computing device 102B, and the server 112 may each host a power generation (PG) program 110A, 110B, 110C, respectively. In one or more other embodiments, the PG program 110A, 110B, 110C may be partially hosted on client computing device 102A, the client computing device 102B, and the server 112 so that functionality may be separated among the devices.

The communication network 114 may include various types of communication networks, such as a wide area network (WAN), local area network (LAN), a telecommunication network, a wireless network, a wireless ad hoc network (i.e., a wireless mesh network), a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing devices 102A, 102B may include a processor 104A, 104B, respectively, and a data storage device 106A, 106B, respectively, that is enabled to host and run a software program 108A, 108B, and a PG program 110A, 110B, respectively, and communicate with the server 112 via the communication network 114, in accordance with embodiments of the invention. In embodiments of the invention, client computing devices 102A, 102B may be, for example, Internet-of-Things (IoT) enabled electric vehicles capable of autonomous vehicle operation (e.g., a self-driving car), running a program, and accessing a network. Furthermore, the client computing devices 102A, 102B may implement and include known transparent photovoltaic technology (i.e., thin-film transparent photovoltaic cells) incorporated on exterior vehicle surfaces (e.g., windshields, windows, body) which may generate electricity via the photovoltaic effect and charge one or more on-board lithium-ion batteries. The client computing devices 110A, 110B may also include light sensors, located on exterior surfaces, capable of detecting amounts of infrared, visible, and ultraviolet light falling on exterior vehicle surfaces. Information from the light sensors may be accessed by software program 108A, 108B, and/or PG program 110A, 110B. Additionally, the client computing devices 102A, 102B may include wireless power transfer (WPT) capability (i.e., electromagnetic power transfer), Global Positioning System (GPS) capability, and may also include multiple outward facing cameras capable of capturing images and/or detecting objects. As will be discussed with reference to FIG. 3, the client computing devices 102A, 102B may include internal components 402a,b and external components 404a,b respectively. As previously described, two client computing devices 102A, 102B are depicted in FIG. 1 for illustrative purposes, but an electric autonomous vehicle ecosystem of a plurality of client computing devices 102A, 102B may be connected via network 114.

The server computer 112 may be a laptop computer, netbook computer, personal computer (PC), a desktop computer, or any programmable electronic device or any network of programmable electronic devices capable of hosting and running an PG program 110B and a database 116 and communicating with the client computing device 102A and the client computing device 102B via the communication network 114, in accordance with embodiments of the invention. As will be discussed with reference to FIG. 3, the server computer 112 may include internal components 402c and external components 404c, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the PG program 110A, 110B, 110C may be a program capable of identifying relative positions of multiple co-located EAVs traveling in a same direction on a roadway, identifying respective and aggregate solar power generation rates and amounts of the EAVs, identifying a direction from which solar light (i.e., sunlight) is impacting the EAVs, analyzing current roadway and weather conditions, implementing collaborative movement and repositioning among the EAVs to maximize aggregate solar power generation among the EAVS or to increase solar power generation of at least one EAV, instructing WPT among two or more EAVs, and creating a knowledge corpus of EAV positioning profiles for maximum solar power generation. According to at least one embodiment, the PG program 110A, 110B, 110C may require each user to opt-in to system usage upon opening or installation of the PG program 110A, 110B, 110C. In at least one other embodiment, the PG program 110A, 110B, 110C may be incorporated as a plug-in to another software application (e.g., as a plug-in to power management software). The PG method is explained in further detail below with respect to FIG. 2.

Figure 2:
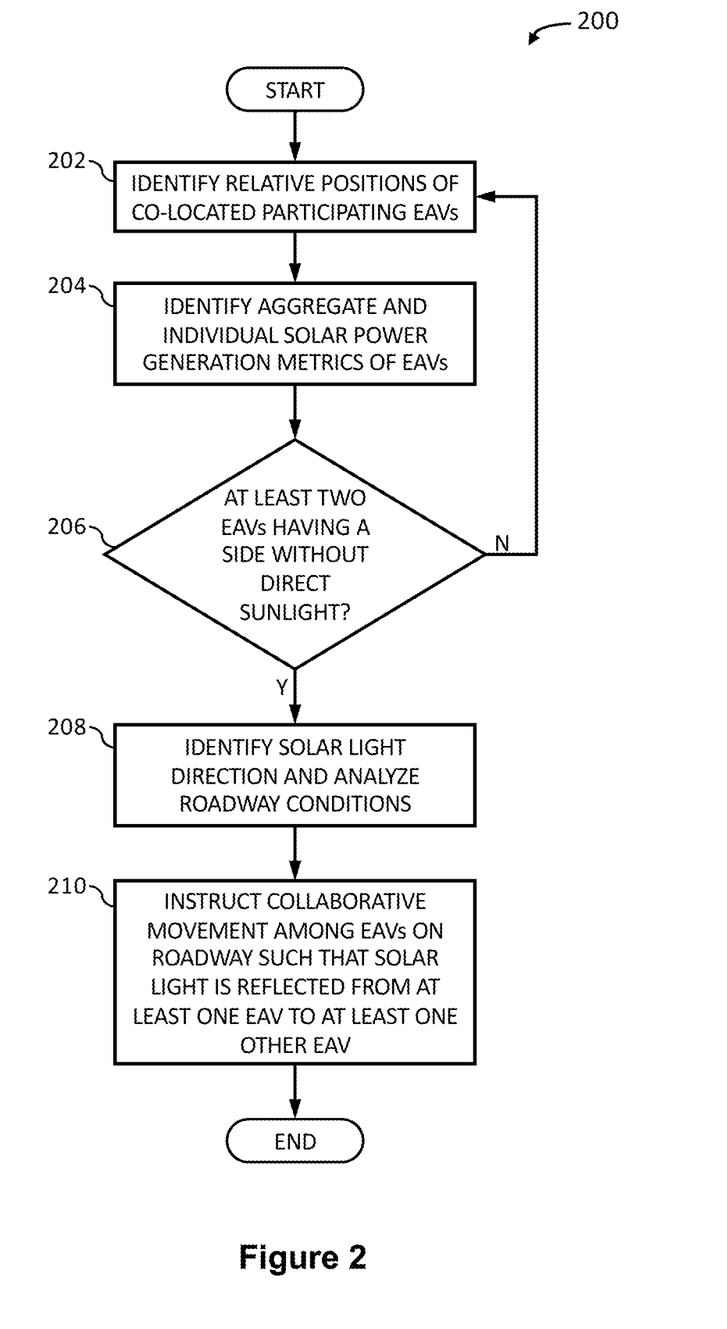
FIG. 2 illustrates an operational flowchart for generating electricity among multiple electric autonomous vehicles in a solar power generation process according to at least one embodiment.

Referring now to FIG. 2, an operational flowchart for instructing collaborative solar power generation among moving EAVs in a solar power generation process 200 is depicted according to at least one embodiment. At 202, the PG program 110A, 110B, 110C identifies first relative positions of a group of co-located EAVs (e.g., client computing devices 102A, 102B) traveling in a same direction on a roadway and opted into PG program 110A, 110B, 110C usage. A relative position of an EAV may include GPS coordinates, a velocity (i.e., speed and direction), and a vehicle ID of the EAV. Moreover, for each EAV of the group, the PG program 110A, 110B, 110C may identify its position relative to one or more other EAVs of the group, and thus identify a first overall positioning of the group of EAVs (i.e., a layout/placement of EAVs, relative to each other, within the group). The PG program 110A, 110B, 110C may access the GPS coordinates and velocity from another application (e.g., software program 108A, 108B). Furthermore, the PG program 110A, 110B, 110C may share the relative positions of the EAVs among the group. As noted above, the EAVs of the group may include thin-film transparent photovoltaic cells, incorporated on the exterior surfaces on all sides of their respective vehicle bodies, which may be used to generate electricity from sunlight and charge respective on-board batteries.

Next, at 204, the PG program 110A, 110B, 110C, identifies solar power generation metrics for each EAV of the group. The identified solar power generation metrics of each EAV may be associated with their respective first relative position identified at 202. Solar power generation metrics of an EAV may include a total amount of generated solar power (i.e., electricity), a current rate of solar power generation for each vehicle exterior surface (e.g., driver side, passenger side, front, hood, back, roof), a current average rate of solar power generation (based on solar power generation rates from vehicle surfaces), a maximum rate of solar power generation (based on a total number of available thin-film transparent photovoltaic cells on vehicle), identification of one or more vehicle exterior surfaces (e.g., sides) not generating solar power or generating solar power below a threshold rate, a current battery level, a current power utilization rate, and a ranked power requirement priority within the group. Additionally, at 204, the PG program 110A, 110B, 110C may share current battery levels and power requirement priorities of the EAVs among the group. Furthermore, at 204, the PG program 110A, 110B, 110C may derive aggregated solar power generation metrics for the group of co-located EAVs based on the individual EAV solar power generation metrics. For instance, the PG program 110A, 110B, 110C may derive a total amount of generated electricity of the group and a current average rate of solar power generation of the group (based on average generation rates of the EAVs). Aggregated solar power generation metrics derived at 204 may be associated with the first overall positioning of the group of EAVs identified at 202.

At 206, the PG program 110A, 110B, 110C determines whether or not there are at least two different EAVs of the group having a same vehicle surface (e.g., side) which is unexposed to direct sunlight. In making this determination, the PC program 110A, 110B, 110C may utilize information from light sensors located on exterior surfaces of the EAVs as well as information from the solar power generation metrics of each EAV (e.g., identification of vehicle portions not generating solar power or generating solar power below a threshold rate) to identify EAVs having a same vehicle side which is not receiving direct sunlight. In response to determining that there are at least two different EAVs of the group having a same vehicle side which is not receiving direct sunlight (step 206, "Y" branch), the solar power generation process 200 may proceed to step 208. In response to determining that there are not at least two different EAVs of the group having a same vehicle side which is not receiving direct sunlight (step 206, "N" branch), the solar power generation process 200 may return to step 202.

Next, at 208, the PG program 110A, 110B, 110C identifies a direction and angle from which solar light is impacting the group of co-located EAVs and analyzes roadway conditions. Solar light direction may be derived from EAV light sensor information, EAV photovoltaic cell activity, or received from another software application (e.g., software program 108A, 108B). Roadway conditions may include roadway size, number of lanes, lane contour, elevation, traffic information (e.g., traffic volume, construction zones, closed lanes, speed limits), and weather information (e.g., cloudiness, precipitation, temperature) and may be accessed by the PG program 110A, 110B, 110C from the interne or from another software application. Additionally, analysis of roadway conditions by the PG program 110A, 110B, 110C may include analysis of shadows (caused by other EAVs of the group, buildings, tress, or other obstacles) present among the EAVs and on the roadway to identify direction, size, and shape of present shadows. Information received from outward facing cameras of the EAVs may also be utilized by the PG program 110A, 110B, 110C when analyzing roadway conditions.

At 210, the PG program 110A, 110B, 110C instructs the EAVs of the group to perform a collaborative movement which results in solar light being reflected from an exterior surface (e.g., a window, a windshield, a body panel having a clear coat paint surface) of at least one EAV to at least a portion of an exterior surface (e.g., side) of at least one other EAV which was previously unexposed to direct sunlight. As the instructed collaborative movement reduces the number of EAV sides unexposed to sunlight, solar power generation of the group of EAVs may be maximized, or at least increased. The instructed collaborative movement may include dynamic reassignment of roadway lane positioning and velocity synchronization among one or more EAVs of the group which enables solar light reflection from one EAV to another. The PG program 110A, 110B, 110C may base calculation of the instructed collaborative movement on the identified first relative positions of the EAVs, the identified first overall positioning of the group of EAVs, the identified solar light direction and angle, distances between EAVs of the group, and the analysis of roadway conditions. The PG program 110A, 110B, 110C may additionally utilize information from outward facing cameras of the EAVs in calculating distances between the EAVs and the instructed collaborative movement. Performance of the instructed collaborative movement may result in second relative positions for EAVs of the group and a second overall positioning of the group of EAVs which may be identified by the PG program 110A, 110B, 110C.

According to at least one further embodiment, the PG program 110A, 110B, 110C may identify new solar power generation metrics for each EAV of the group subsequent to performance of the instructed collaborative movement. The identified new solar power generation metrics of each EAV may be associated with their respective second relative position identified at 210. Likewise, the PG program 110A, 110B, 110C may also derive new aggregated solar power generation metrics which may be associated with the second overall positioning of the group identified at 210. The PG program 110A, 110B, 110C may compare old and new solar power generation metrics for each EAV as well as compare old and new aggregated solar power generation metrics for the group in order to determine if the instructed collaborative movement resulted in increased amounts or rates (e.g., average rates) of solar power generation of a particular EAV or of the group. If solar power generation amounts or rates of a particular EAV or of the group have not increased, the PG program 110A, 110B, 110C may calculate and instruct a new collaborative movement for the group of EAVs.

According to at least one further embodiment, subsequent to performance of the instructed collaborative movement, the PG program 110A, 110B, 110C may utilize the new solar power generation metrics of each EAV of the group to identify a particular EAV having a highest ranked power requirement priority within the group and, accordingly, instruct one or more other EAVs of the group to perform a WPT with the particular EAV. In another embodiment, EAVs having a ranked power requirement priority above a threshold level may be identified and the PG program 110A, 110B, 110C may instruct one or more other EAVs of the group to perform a WPT with the EAVs having a ranked power requirement priority above the threshold level.

According to at least one further embodiment, the PG program 110A, 110B, 110C may compare old and new solar power generation metrics for each EAV of the group to determine if a portion of a particular EAV which was previously identified as not generating solar power or generating solar power below a threshold rate is now, subsequent to performance of the instructed collaborative movement, generating solar power or generating solar power at or above a threshold rate. Additionally, subsequent to performance of the instructed collaborative movement, the PG program 110A, 110B, 110C may access information from light sensors located on exterior surfaces of the EAVs as well as information from the new solar power generation metrics of each EAV to determine if a portion of a particular EAV which was previously identified as unexposed to direct sunlight is now receiving sunlight. If the portion of the particular EAV is not generating solar power, generating solar power below a threshold rate, or is unexposed to direct sunlight, the PG program 110A, 110B, 110C may calculate and instruct a new collaborative movement for the group of EAVs.

According to at least one further embodiment, the PG program 110A, 110B, 110C may utilize information from outward facing cameras and light sensors of the EAVs of the group to identify if a particular EAV is causing a shadow on another EAV or is an obstacle to the ability of the other EAV to receive reflected light and, accordingly, instruct movement and placement of the particular EAV within the group so as not to cause a shadow on the other EAV or be an obstacle to the ability of the other EAV to receive reflected light. Furthermore, in at least one embodiment, the PG program 110A, 110B, 110C may instruct a collaborative movement among the EAVs of the group so as to avoid shadowed portions of the roadway.

According to at least one further embodiment, the PG program 110A, 110B, 110C may instruct the EAVs (e.g., client computing devices 102A, 102B) of the group to perform a collaborative movement in response to identification of a particular EAV having a highest ranked power requirement priority within the group or having a lowest current battery level among the group. In such an embodiment, the instructed collaborative movement may result in solar light being reflected from an exterior surface of one or more other EAVs of the group to an exterior side of the particular EAV having the highest ranked power requirement priority within the group or having the lowest current battery level among the group. Calculation of the instructed collaborative movement may be similar to that described at 210.

According to at least one further embodiment, the PG program 110A, 110B, 110C may instruct the EAVs of the group to perform a collaborative movement in response to a change in the identified direction and angle from which solar light is impacting the group of co-located EAVs. In such an embodiment, the instructed collaborative movement may enable solar light reflection among EAVs the group based on the changed direction and angle of the solar light. The solar light reflection among the group may facilitate an increased solar power generation amount or rate of the group or of a particular EAV of the group.

According to at least one further embodiment, the PG program 110A, 110B, 110C may create a knowledge corpus of overall positioning profiles for a group of EAVs (e.g., client computing devices 102A, 102B). Each overall positioning profile may include information on EAV placement and velocity synchronization for a given number of EAVs based on a given time of day, particular roadway conditions (e.g., number of available lanes, lane contour, etc.), particular weather conditions (e.g., cloudiness), and a solar power generation goal (e.g., increase a rate of solar power generation of a particular EAV or of the group). The knowledge corpus of overall positioning profiles may be stored within one or more of data storage devices 106A, 106B and database 116, and may be accessed by the PG program 110A, 110B, 110C when calculating a collaborative movement of the group of EAVs.

It may be appreciated that FIG. 2 provides only an illustration of one implementation and do not imply any limitations with regard to how different embodiments may be implemented. Many modifications to the depicted environments may be made based on design and implementation requirements.

Figure 3:
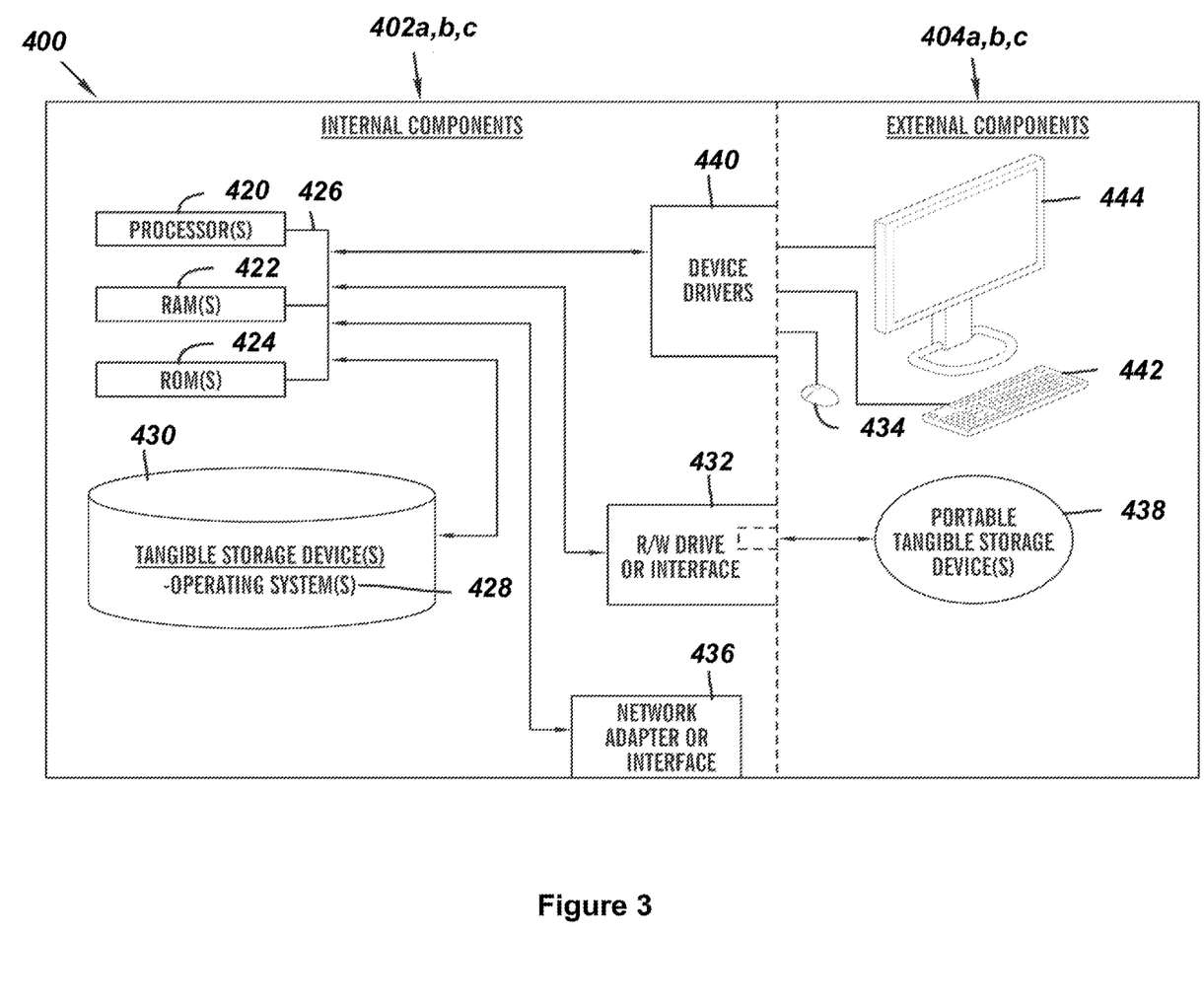
FIG. 3 is a functional block diagram of internal and external components of computers and servers depicted in FIG. 1 according to at least one embodiment.

FIG. 3 is a block diagram 400 of internal and external components of the client computing device 102A, the client computing device 102B, and the server 112 depicted in FIG.

1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102A, the client computing device 102B, and the server 112 may include respective sets of internal components 402 a,b,c and external components 404 a,b,c illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108A and the PG program 110A in the client computing device 102A, the software program 108B and the PG program 110B in the client computing device 102B, and the PG program 110C in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b,c also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the PG program 110A, 110B, 110C can be stored on one or more of the respective portable computer-readable tangible storage devices 438, read via the respective R/W drive or interface 432, and loaded into the respective hard drive 430.

Each set of internal components 402 a,b,c also includes network adapters or interfaces 436 such as a TCP/IP adapter cards, wireless Wi-Fi interface cards, or 3G or 4G wireless interface cards or other wired or wireless communication links. The software program 108A and the PG program 110A in the client computing device 102A, the software program 108B and the PG program 110B in the client computing device 102B, and the PG program 110C in the server 112 can be downloaded to the client computing device 102A, the client computing device 102B, and the server 112 from an external computer via a network (for example, the Internet, a local area network or other, wide area network) and respective network adapters or interfaces 436. From the network adapters or interfaces 436, the software program 108A and the PG program 110A in the client computing device 102A, the software program 108B and the PG program 110B in the client computing device 102B, and the PG program 110C in the server 112 are loaded into the respective hard drive 430. The network may comprise copper wires, optical fibers, wireless transmission, routers, firewalls, switches, gateway computers and/or edge servers.

Each of the sets of external components 404 a,b,c can include a computer display monitor 444, a keyboard 442, and a computer mouse 434. External components 404 a,b,c can also include touch screens, virtual keyboards, touch pads, pointing devices, and other human interface devices. Each of the sets of internal components 402 a,b,c also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
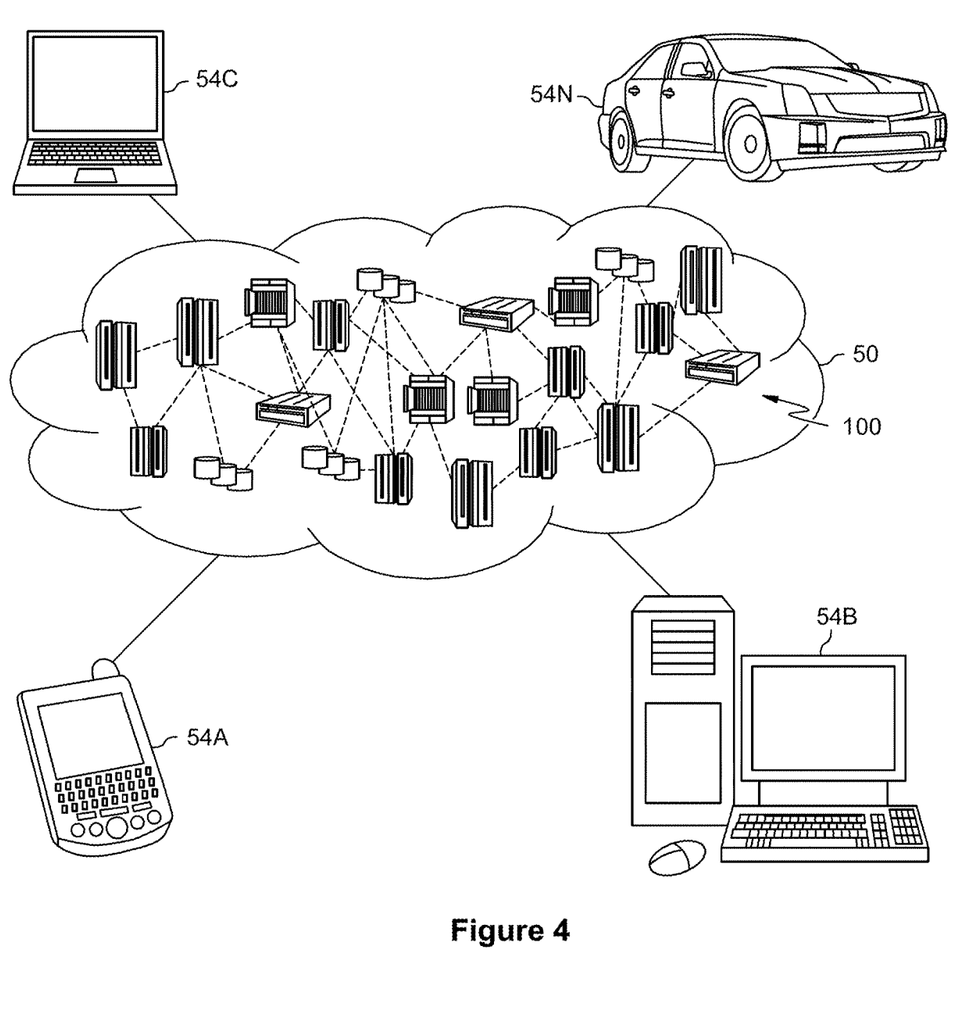
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
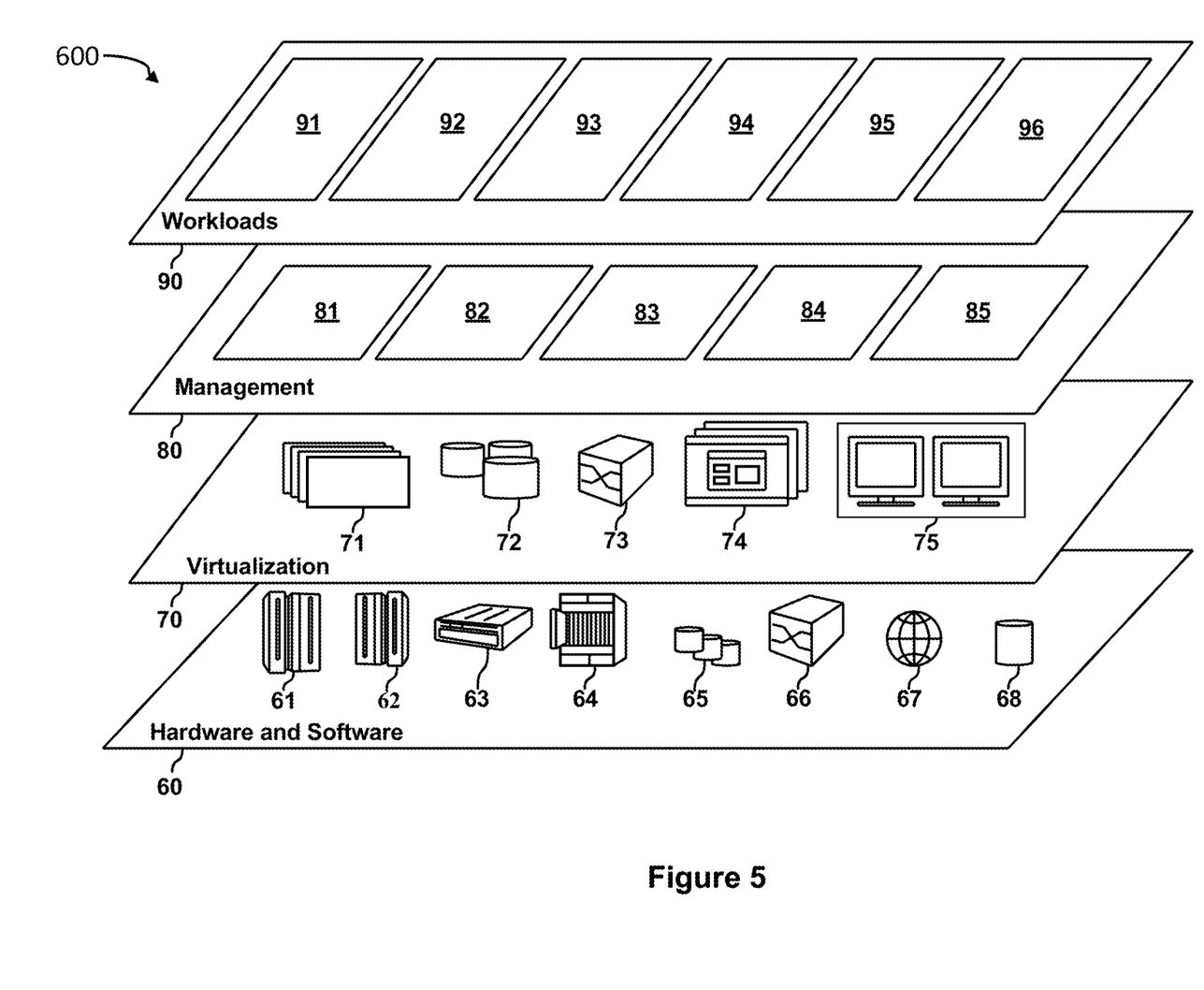
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solar power generation 96. Solar power generation 96 may relate to solar power generation via reflected solar light among a group of electric autonomous vehicles.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    identifying relative positions of co-located electric autonomous vehicles (EAVs) within a group;
    identifying solar power generation metrics for each EAV of the group;
    determining whether at least two EAVs of the group have a same side unexposed to direct sunlight based the solar power generation metrics for each EAV;
    in response to determining at least two EAVs of the group have a same side unexposed to direct sunlight, identifying a direction and an angle of solar light impacting the group; and
    based on the relative positions and the direction and angle of solar light, instructing a collaborative movement among the group such that solar light is reflected from an exterior surface of at least one EAV to an exterior surface of at least one other EAV which was unexposed to direct sunlight.

2. The method of claim 1, further comprising:
    identifying an EAV of the group having a highest ranked power requirement priority within the group; and
    instructing a collaborative movement among the group such that solar light is reflected from an exterior surface of the at least one other EAV of the group to the EAV.

3. The method of claim 1, wherein each EAV of the group comprises thin-film transparent photovoltaic cells and light sensors incorporated on exterior vehicle surfaces.

4. The method of claim 1, wherein a relative position of an EAV comprises global positioning system (GPS) coordinates, a velocity, and a vehicle ID.

5. The method of claim 1, wherein solar power generation metrics of an EAV comprise a total amount of generated solar power, a current rate of solar power generation for each vehicle exterior surface, a current average rate of solar power generation, identification of one or more vehicle exterior surfaces not generating solar power or generating solar power below a threshold rate, a current battery level, a current power utilization rate, and a ranked power requirement priority within the group.

6. The method of claim 1, wherein the EAVs are traveling in a same direction on a roadway, and wherein the instructed collaborative movement comprises dynamic reassignment of roadway lane positioning and velocity synchronization among one or more of the EAVs.

7. The method of claim 1, wherein identification of the direction and the angle of solar light impacting the group further comprises an analysis of roadway conditions including roadway size, a number of lanes, lane contour, elevation, traffic information, weather information, and shadows.

8. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        identifying solar power generation metrics for each EAV of the group;
        determining whether at least two EAVs of the group have a same side unexposed to direct sunlight based the solar power generation metrics for each EAV;
        in response to determining at least two EAVs of the group have a same side unexposed to direct sunlight, identifying a direction and an angle of solar light impacting the group; and
        based on the relative positions and the direction and angle of solar light, instructing a collaborative movement among the group such that solar light is reflected from an exterior surface of at least one EAV to an exterior surface of at least one other EAV which was unexposed to direct sunlight.

9. The computer system of claim 8, further comprising:
    identifying an EAV of the group having a highest ranked power requirement priority within the group; and
    instructing a collaborative movement among the group such that solar light is reflected from an exterior surface of the at least one other EAV of the group to the EAV.

10. The computer system of claim 8, wherein each EAV of the group comprises thin-film transparent photovoltaic cells and light sensors incorporated on exterior vehicle surfaces.

11. The computer system of claim 8, wherein a relative position of an EAV comprises global positioning system (GPS) coordinates, a velocity, and a vehicle ID.

12. The computer system of claim 8, wherein solar power generation metrics of an EAV comprise a total amount of generated solar power, a current rate of solar power generation for each vehicle exterior surface, a current average rate of solar power generation, identification of one or more vehicle exterior surfaces not generating solar power or generating solar power below a threshold rate, a current battery level, a current power utilization rate, and a ranked power requirement priority within the group.

13. The computer system of claim 8, wherein the EAVs are traveling in a same direction on a roadway, and wherein the instructed collaborative movement comprises dynamic reassignment of roadway lane positioning and velocity synchronization among one or more of the EAVs.

14. The computer system of claim 8, wherein identification of the direction and the angle of solar light impacting the group further comprises an analysis of roadway conditions including roadway size, a number of lanes, lane contour, elevation, traffic information, weather information, and shadows.

15. A non-transitory computer-readable storage medium storing a computer program product, the computer program product comprising:
    program instructions executable by a processor capable of performing a method, the method comprising:
        identifying solar power generation metrics for each EAV of the group;
        determining whether at least two EAVs of the group have a same side unexposed to direct sunlight based the solar power generation metrics for each EAV;
        in response to determining at least two EAVs of the group have a same side unexposed to direct sunlight, identifying a direction and an angle of solar light impacting the group; and
        based on the relative positions and the direction and angle of solar light, instructing a collaborative movement among the group such that solar light is reflected from an exterior surface of at least one EAV to an exterior surface of at least one other EAV which was unexposed to direct sunlight.

16. The computer program product of claim 15, further comprising:
- identifying an EAV of the group having a highest ranked power requirement priority within the group; and
- instructing a collaborative movement among the group such that solar light is reflected from an exterior surface of the at least one other EAV of the group to the EAV.

17. The computer program product of claim 15, wherein each EAV of the group comprises thin-film transparent photovoltaic cells and light sensors incorporated on exterior vehicle surfaces.

18. The computer program product of claim 15, wherein a relative position of an EAV comprises global positioning system (GPS) coordinates, a velocity, and a vehicle ID.

19. The computer program product of claim 15, wherein the EAVs are traveling in a same direction on a roadway, and wherein the instructed collaborative movement comprises dynamic reassignment of roadway lane positioning and velocity synchronization among one or more of the EAVs.

20. The computer program product of claim 15, wherein identification of the direction and the angle of solar light impacting the group further comprises an analysis of roadway conditions including roadway size, a number of lanes, lane contour, elevation, traffic information, weather information, and shadows.

* * * * *